(12) United States Patent
Hironaka

(10) Patent No.: US 6,221,947 B1
(45) Date of Patent: Apr. 24, 2001

(54) REINFORCED AND FLAME-RETARDED THERMOPLASTIC RESIN COMPOSITION AND PROCESS FOR PRODUCING THE SAME

(75) Inventor: Katsuhiko Hironaka, Chiba (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/308,335

(22) PCT Filed: Sep. 24, 1998

(86) PCT No.: PCT/JP98/04281
§ 371 Date: May 18, 1999
§ 102(e) Date: May 18, 1999

(87) PCT Pub. No.: WO99/15591
PCT Pub. Date: Apr. 1, 1999

(30) Foreign Application Priority Data

Sep. 25, 1997 (JP) .................................... 9-260204

(51) Int. Cl.⁷ ..................................... C08K 3/38
(52) U.S. Cl. .................. 524/405; 525/409; 525/411; 525/412
(58) Field of Search ................... 524/405, 409, 524/411, 412

(56) References Cited

U.S. PATENT DOCUMENTS 3,920,606  11/1975  Diebel et al. .
5,194,481 * 3/1993  Takagi et al. ................ 524/410
5,207,967 * 5/1993  Small, Jr. et al. ............ 524/537

FOREIGN PATENT DOCUMENTS 0 149 815 A2  7/1985  (EP) .
0 585 056 A2  3/1994  (EP) .
0 736 568 A1  10/1996  (EP) .

OTHER PUBLICATIONS

Abstract of JP 59 202253 A, Patent Abstracts of Japan, vol. 009, No. 071, Nov. 16, 1984.

Abstract of JP 09 059509 A, Patent Abstracts of Japan, vol. 097, No. 007, Jul. 31, 1997.

XP002114832, Abstract of JP 08 048839 A, Database WPI, Section Ch, Week 9617, Feb. 20, 1996.

* cited by examiner

*Primary Examiner*—Ana Woodward
(74) *Attorney, Agent, or Firm*—Sughrue, Mion, Zinn, Macpeak & Seas, PLLC

(57) ABSTRACT

According to the present invention, a resin composition having flame retardancy, high tracking resistance and excellent mechanical properties can be obtained by compounding aluminum borate whiskers with a thermoplastic resin that has been flame-retarded with a halogen-based flame retardant.

14 Claims, No Drawings

REINFORCED AND FLAME-RETARDED THERMOPLASTIC RESIN COMPOSITION AND PROCESS FOR PRODUCING THE SAME

FIELD OF THE TECHNOLOGY

The present invention relates to a reinforced and flame-retarded thermoplastic resin composition. More specifically, it relates to a thermoplastic resin composition having excellent heat resistance, mechanical properties, flame retardancy and electric properties and to a production process therefor.

BACKGROUND

Thermoplastic resins are used for a variety of purposes due to excellent moldability thereof. Of the thermoplastic resins, use of engineering plastics in auto parts, structural parts, electric and electronic parts has been expanding making use of heat resistance thereof. In the field of electric and electronic parts, while efforts are being made to reduce weight, thickness and size and improve performance, safety at the time of use, productivity, use of reclaimed resources and the like are desired. Therefore, the application of thermoplastic resins, mainly polyester resins which have excellent heat resistance, moldability and chemical resistance and are easy to be flame-retarded, has been growing more than thermosetting resins.

When these thermoplastic resins are used in electric and electronic parts, they are generally reinforced with fibrous reinforcements and flame-retarded with halogen-based flame retardants typified by bromine-based flame retardants in order to improve the strength and safety of products comprising such parts.

Although thermoplastic resins themselves have high tracking resistance, one of the measures of electric insulating properties, the tracking resistance of the thermoplastic resins greatly lowers when they are reinforced and flame-retarded, whereby the risk of a fire rises despite the acquired flame-retardancy.

Many attempts have been made to improve the tracking resistance of the thermoplastic resins. For instance, blending of a metal oxide, metal silicate compound or the like with the thermoplastic resins has been proposed. This, however, has resulted in a reduction in mechanical properties in many cases.

Under such circumstances, a thermoplastic resin having excellent mechanical properties, flame retardancy and tracking resistance has been strongly desired.

Mitsubishi Electric Technical Report Vol. 69, No. 4 (1995) reports at pages 40 to 43 that when an overcurrent tripping test was made on reinforced resin compositions prepared by compounding aluminum borate whiskers, aluminum silicate fibers, E glass fibers, wollastonite, illite, mica or potassium titanate whiskers with nylon 46, aluminum borate whiskers, aluminum silicate fibers and wollastonite cut off a current more frequently than glass fibers, which are generally used as an inorganic reinforcement for resins, whereas potassium titanate whiskers and mica cut off a current less frequently than the glass fibers. The above report discloses no resin compositions comprising both a flame retardant and a reinforcement.

JP-B 6-4765 discloses a resin composition prepared by compounding aluminum borate whiskers with a resin (excluding a polyvinyl chloride resin). This publication discloses a flame retardant as one of additives that may be added to the resin composition as required. However, it shows no specific examples of the flame retardant or problems accompanied with the use of a flame retardant.

DISCLOSURE OF THE INVENTION

It is an object of the present invention to provide a thermoplastic resin composition having excellent mechanical properties, flame retardancy and tracking resistance.

It is another object of the present invention to provide a flame-retarded thermoplastic resin composition that is reinforced with aluminum borate whiskers and that can fully exhibit the above properties, unlike thermoplastic resin compositions reinforced with other whiskers.

It is still another object of the present invention to provide a novel use of aluminum borate whiskers.

It is a further object of the present invention to provide a process for improving the tracking resistance of the above thermoplastic resin composition of the present invention.

Other objects and advantages of the present invention will become apparent from the following description.

According to the present invention, the above objects and advantages of the present invention are attained by a thermoplastic resin composition that comprises (A) 100 parts by weight of a thermoplastic resin, (B) 5 to 80 parts by weight of a halogen-based flame retardant and (C) 5 to 200 parts by weight of aluminum borate whiskers.

The present invention will be described in detail hereunder.

Illustrative examples of the thermoplastic resin as the component (A) used in the present invention include general-purpose plastics such as polyethylene, polypropylene, ABS and polystyrene; engineering plastics such as aromatic polyesters, aromatic polycarbonates (may be abbreviated as PC hereinafter), polyamides, polyoxymethylene and modified polyphenylene ethers; super engineering plastics such as aromatic polyamides, PPS and liquid crystal polymers; and the like.

Aromatic polyesters, aromatic polycarbonates and polyamides are preferred from the viewpoint of adaptability to electric and electronic parts having heat resistance and heat aging resistance, and aromatic polyesters and aromatic polycarbonates are particularly preferred from the viewpoint of balance among properties, moldability and economy. Of the aromatic polyesters, polybutylene terephthalate (may be abbreviated as PBT hereinafter) is particularly preferred.

The component (A) may be one or a mixture of the above thermoplastic resins, or a copolymer obtained by copolymerizing part of a thermoplastic resin with another copolymerizable component. In the case of a copolymer, the proportion of the copolymerizable component is preferably 40 mol% or less.

The degree of polymerization of the thermoplastic resin as the component (A) is selected from a range that does not greatly impair mechanical properties and flowability at the time of molding. For example, a thermoplastic polyester preferably has an intrinsic viscosity, measured in o-chlorophenol at 35° C., of 0.5 to 1.5, particularly preferably 0.6 to 1.2. An aromatic polycarbonate preferably has a molecular weight of 15,000 or more, particularly preferably 18,000 to 30,000.

Any known processes may be used for producing the thermoplastic resin as the component (A). For example, aromatic polyesters may be produced by a general production process, exemplified by a process using a melt-polycondensation reaction or a process using a melt-polycondensation reaction and a solid-phase polycondensation reaction in combination.

Describing a process for producing polybutylene terephthalate, for example, polybutylene terephthalate can be produced by having terephthalic acid or an ester-forming derivative thereof (for example, a lower alkyl ester such as a dimethyl ester or monomethyl ester) reacted with tetramethylene glycol or an ester-forming derivative thereof by heating in the presence of a catalyst and polymerizing the obtained glycol ester of terephthalic acid to a predetermined degree of polymerization in the presence of a catalyst.

The most typical aromatic polycarbonate using bisphenol A as a divalent phenol can be produced by a process comprising the steps of adding gaseous or liquid phosgene to a mixed solution of an alkali aqueous solution of bisphenol A and methylene chloride and subjecting the mixture to polymerization in the presence or absence of a catalyst, or a process comprising the steps of subjecting bisphenol A and diphenyl carbonate to an ester interchange reaction while a phenol by-produced in the presence of an ester interchange catalyst is removed.

The halogen-based flame retardant as the component (B) used in the present invention is generally used as a flame retardant. The halogen is preferably bromine or chlorine.

Typical examples of the halogenated compound include brominated polystyrene, crosslinked brominated polystyrene, brominated polyphenylene ethers, brominated bisphenol A-type epoxy resins and/or modified products thereof obtained by blocking part or all of terminal glycidyl groups of the resins, brominated acrylic resins, polycarbonate oligomers produced from brominated bisphenol A, brominated biphenyl ethers, brominated diphthalimide compounds, chlorinated hexapentadiene dimers and the like. Of these, brominated polystyrene is particularly preferred because it experiences only a small reduction in tracking resistance.

The proportion of the halogen-based flame retardant is 5 to 80 parts by weight based on 100 parts by weight of the thermoplastic resin as the component (A). When the proportion is smaller than 5 parts by weight, the effect of furnishing the thermoplastic resin composition with flame-retardancy is not satisfactory. On the other hand, when the proportion is larger than 80 parts by weight, the obtained composition is inferior in flowability, mechanical properties and the like of the composition disadvantageously.

The proportion of the halogen-based flame retardant is preferably 10 to 40 parts by weight based on the same standard.

The aluminum borate whiskers as the component (C) used in the present invention are the needle-like crystals of aluminum borate represented by the general formula $nAl_2O_3 \cdot mB_2O_3$. The aluminum borate whiskers preferably have an average whisker diameter of 0.1 to 5 $\mu$m and preferably have an average whisker length of 1 to 50 $\mu$m before blended with the thermoplastic resin.

Aluminum borate is represented by the chemical formula $9Al_2O_3 \cdot 2B_2O_3$, $2Al_2O_3 \cdot B_2O_3$ or $Al_2O_3 \cdot B_2O_3$, for example. Aluminum borate represented by $9Al_2O_3 \cdot 2B_2O_3$ is particularly preferred.

The aluminum borate whiskers as the component (C) used in the present invention may be surface-treated with a silane coupling agent or the like to improve affinity for the thermoplastic resin and to further enhance a reinforcing effect.

Most of the thermoplastic resins as the component (A) show high tracking resistance as a characteristic property thereof. For example, polybutylene terephthalate (PBT), a typical aromatic polyester, shows a very high comparative tracking index (CTI) of 600 V or more. However, when PBT is compounded with glass fibers or a halogen-based flame retardant as the component (B) to improve mechanical properties and flammability, its tracking resistance greatly lowers in general.

On the other hand, when a composition prepared by compounding (B) the halogen-based flame retardant with (A) the thermoplastic resin was further compounded with (C) aluminum borate whiskers, a composition could be obtained that shows greatly improved tracking resistance and excellent mechanical properties while retaining flame-retardancy.

Further, when glass fibers and other whiskers of the same shape are used, they exhibit a reinforcing effect but no effect of improving tracking resistance. This effect is unique to the aluminum borate whiskers.

The proportion of the aluminum borate whiskers as the component (C) used in the present invention is 5 to 200 parts by weight, preferably 5 to 100 parts by weight, more preferably 10 to 100 parts by weight, based on 100 parts by weight of the thermoplastic resin as the component (A). When the proportion is lower than 5 parts by weight, the effect of improving tracking resistance and the effect of reinforcing mechanical properties are not satisfactory. On the other hand, when the proportion is more than 200 parts by weight, the obtained composition is inferior in moldability such as flowability.

In the present invention, in order to improve flame retardancy, it is preferred to further compound an antimony-based flame retardant aid (D) which is synergistic with the halogen-based flame retardant as the component (B).

Therefore, according to the present invention, secondly, there is provided a thermoplastic resin composition that comprises (A) 100 parts by weight of a thermoplastic resin, (B) 5 to 80 parts by weight of a halogen-based flame retardant, (C) 5 to 100 parts by weight of aluminum borate whiskers, and (D) 1 to 20 parts by weight of an antimony-based flame retardant aid.

The antimony-based flame retardant aid as the component (D) used in the present invention shows a synergistic effect with the halogen-based flame retardant as the component (B) and can serve to further improve the flame retardancy of the thermoplastic resin when it is compounded.

As the antimony-based flame retardant aid (D) may be used antimony trioxide, antimony tetraoxide, antimony pentaoxide represented by $(NaO)p \cdot (Sb_2O_5) \cdot qH_2O$ (p=0 or 1, q =0 to 4) or sodium atimonate. The average particle diameter of the antimony-based flame retardant aid is preferably 0.02 to 5 $\mu$m.

The flame retardant aid as the component (D) may be comprised of only one compound or a combination of two or more of the compounds. The antimony-based flame retardant aid may be surface-treated with an epoxy compound, silane compound, isocyanate compound, titanate compound or the like as required.

The proportion of the flame retardant aid as the component (D) is appropriate when one antimony atom exists based on every two to five halogen atoms of the halogen-based flame retardant aid as the component (B) and is preferably 1 to 20 parts by weight based on 100 parts by weight of the thermoplastic resin. When the proportion is smaller than 1 part by weight, the effect of the flame retardant aid is small. On the other hand, once the proportion is larger than 20 parts by weight, an increase in the effect can no longer be expected even by further compounding the flame retardant aid and the obtained thermoplastic resin composition is inferior in mechanical properties and moldability such as flowability.

To the resin composition of the present invention may be added a pigment and other compounding ingredients as required in amounts needed for them to take effect. Illustrative examples of the compounding ingredients include fibrous fillers such as glass fibers, aramide fibers, carbon fibers, steel fibers, asbestos, ceramic fibers and potassium titanate whiskers, and powdery, granular or flaky inorganic fillers such as kaolin, clay, wollastonite, talc, mica, calcium carbonate, barium sulfate, glass beads and glass flakes.

To improve heat resistance, an antioxidant such as a hindered phenol compound, aromatic amine compound, organic phosphorus compound or sulfur compound or a thermal stabilizer may be added. To improve melt-viscosity stability and hydrolytic resistance, a variety of epoxy compounds, oxazoline compound or the like may be added.

Preferred examples of the epoxy compound include a bisphenol A-type epoxy compound obtained by reacting bisphenol A with epichlorohydrin, an aliphatic glycidyl ether obtained by reacting a glycol or glycerol with epichlorohydrin, a novolak-type epoxy compound, an aromatic or aliphatic carboxylic acid-type epoxy compound or an alicyclic compound-type epoxy compound. The oxazoline compound is preferably an aromatic or aliphatic bisoxazoline, particularly preferably 2,2'-bis(2-oxazoline) or 2,2'-m-phenylenebis(2-oxazoline).

In addition, a stabilizer, colorant, impact-improving agent, lubricant, ultraviolet absorber, antistatic agent, halogen-free flame retardant and antimony-free flame retardant aid may be added. Illustrative examples of the antimony-free flame retardant aid include metal compounds such as iron oxide, zinc oxide, zinc borate and zinc stannate.

Further, an elastomer such as a polyamide elastomer or polyester elastomer, or a thermosetting resin such as a phenol resin, melamine resin, unsaturated polyester resin or silicone resin may be compounded in small quantities.

In the resin composition of the present invention, these compounding ingredients are preferably dispersed homogeneously. Any methods of compounding these ingredients are acceptable. For example, one of such methods comprises the steps of supplying all or part of the ingredients into a heated single-screw or twin-screw extruder in one lot or several lots, melt-kneading them to give a homogenous molten resin, extruding the resin into a wire form; quenching to solidify the molten. resin and cutting it to a desired length to form grains. To fully exhibit the reinforcing effect of aluminum borate whiskers, a method is preferred in which a twin-screw extruder is used and aluminum borate whiskers are charged separately from a supply port provided at an intermediate position of the barrel of the extruder. In the above methods, other mixers such as a blender, kneader or roller may be used. They may be used in combination, and compounding ingredients can be added sequentially by repeating compounding several times with the mixer(s).

To obtain a resin molded product from the thus produced molding resin composition, the molding resin composition is supplied to a molding machine such as an injection molding machine in a fully dried state and then molded. Further, the raw materials of the resin composition may be dry-blended, charged directly into the hopper of a molding machine and melt-kneaded in the molding machine.

The thus produced thermoplastic resin composition of the present invention comprises a thermoplastic resin and a halogen-based flame retardant and shows a larger comparative tracking index (CTI) than a thermoplastic composition containing no aluminum borate whiskers.

That is, according to the present invention, there is also provided a process for improving the CTI of a thermoplastic resin composition containing a halogen-based flame retardant, the process comprising the steps of compounding 5 to 200 parts by weight of aluminum borate whiskers with a combination of 100 parts by weight of a thermoplastic resin and 5 to 80 parts by weight of a halogen-based flame retardant.

According to the process of the present invention, the thermoplastic resin composition of the present invention is advantageously produced that has a CTI at least 50 V larger than the CTI value of a corresponding thermoplastic resin composition consisting of a thermoplastic resin and a halogen-based flame retardant and containing no aluminum borate whiskers.

According to the present invention, based on the finding of the inventor of the present invention, there is also provided use of aluminum borate whiskers for improving the CTI of a resin composition containing a thermoplastic resin and a halogen-based flame retardant.

The thermoplastic resin composition of the present invention preferably has a CTI of at least 300 V when the thermoplastic resin is an aromatic polyester and a CTI of at least 200 V when the thermoplastic resin is a polycarbonate.

EXAMPLES

The following examples are given to further illustrate the present invention. The properties of the following examples were measured in accordance with the following methods. Units of Table 1 are parts by weight.

(1) Mechanical properties:

A tensile test was carried out in accordance with ASTM D638 and a flexural test in accordance with ASTM D790.

(2) Deflection temperature under load:

This was measured in accordance with ASTM D648.

(3) Flammability:

This was evaluated in accordance with a method (UL94) specified by Underwriters Laboratories Inc. The thickness of a polybutylene terephthalate (PBT) test sample piece was 0.8 mm and that of an aromatic polycarbonate (PC) test sample piece was 1.6 mm.

(4) Comparative Tracking Index (CTI):

This was measured in accordance with IEC standards, Publ.112, the second version.

(5) Intrinsic viscosity of PBT:

This was measured at 35° C. in o-chlorophenol as a solvent using an Ostwald viscometer.

Examples 1 to 4 and Comparative Examples 1 to 6

(A) PBT that had been dried with hot air at 130° C. for 8 hours and had an intrinsic viscosity of 0.88 (a product of Teijin Limited), (A) PC that had been dried with hot air at 120° C. for 8 hours (Panlite L-1225 of Teijin Chemicals Ltd.), (B) brominated polystyrene (PDBS80 of Great Lakes Chemical Corporation of the US), (C) aluminum borate whiskers that had been surface-treated with aminosilane (Arborex YS-3A having an average fiber diameter of 0.5 to 1.0 μm and an average fiber length of 10 to 30 μm of Shikoku Chemical Corporation), (D) antimony trioxide (PATOX-M of Nihon Seiko Co., Ltd.) and glass fibers (3-mm chopped strand having an average fiber diameter of 13 μm of Nippon Electric Glass Co., Ltd.) were melt-kneaded in ratios shown in Table 1 using a vented twin-screw extruder having a screw diameter of 44 mm with a vent port through which air and volatile gases are vacuumed. They were kneaded at a cylinder temperature of 250° C., a screw revolution of 120 rpm and a discharge rate of 30 kg/hr when PBT was used and at a cylinder temperature of 300° C., a screw revolution of 120 rpm and a discharge rate of 30 kg/hr when PC was used. Threads discharged from a dice were cooled and cut to obtain pellets for molding. The aluminum borate whiskers (C) and glass fibers were charged from a vent port and other ingredients from a main supply port.

Thereafter, a molded product for the measurement of properties was formed using the pellets and an injection molding machine having an injection capacity of 5 ounces. The pellets were molded at a cylinder temperature of 250° C., a mold temperature of 60° C., an injection pressure of 60 MPa, a cooling time of 12 sec and a total molding cycle of 40 sec when PBT was used and at a cylinder temperature of 300° C., a mold temperature of 100° C., an injection pressure of 80 MPa, a cooling time of 15 sec. and a total molding cycle of 45 sec when PC was used.

For comparison, compositions shown in Table 1 were extruded and molded in the same manner as described above except that potassium titanate whiskers (Tibrex having an average whisker diameter of 1 μm or less and an average whisker length of 20 μm of Kawatetsu Mining Co., Ltd.) and calcium carbonate whiskers (Whiscal having an average whisker diameter of 0.5 to 1.0 μm and an average whisker length of 20 to 30 μm of Maruo Calcium Co., Ltd.) were used in place of the aluminum borate whiskers (C).

Although PBT itself has a high CTI value, it is inferior in flame retardancy and unsatisfactory in terms of mechanical properties (Comparative Example 1). The flame retardancy of the PBT can be improved by compounding the PBT with a bromine-based flame retardant, but the CTI value of the resulting composition is very low (Comparative Example 2). When flame-retarded PBT is reinforced with glass fibers, the CTI value thereof becomes much lower (Comparative Example 3).

However, when the flame-retarded PBT is compounded with aluminum borate whiskers, the resulting composition shows a high CTI value while flame-retarded and can also obtain a reinforcing effect at the same time (Example 1). This effect is obtained even when aluminum borate whiskers and glass fibers are used in combination (Examples 2 and 3).

The same test was made on other whiskers of the same shape in place of the borate whiskers. Flame retardancy and a reinforcing effect were obtained, while the CTI value of the resulting composition did not improve at all. Therefore, it is understood that aluminum borate whiskers exhibited a peculiar effect (Comparative Examples 4 and 5).

Further, when PC was used, the similar effect was also obtained (Example 4 and Comparative Example 6).

What is claimed is:

1. A thermoplastic resin composition comprising:
    (A) 100 parts by weight of a thermoplastic resin;
    (B) 5 to 80 parts by weight of a halogen-based flame retardant selected from the group consisting of a bromine-based flame retardant, a chlorine-based flame retardant and a mixture thereof; and

TABLE 1

| | (A) PBT resin | (A) PC resin | (B) brominated polystyrene | (C) aluminum borate whiskers | potassium titanate whiskers | calcium carbonate whiskers | glass fibers | (D) antimony trioxide |
|---|---|---|---|---|---|---|---|---|
| | | | | | | | | (parts by weight) |
| Comp.Ex.1 | 100 | — | — | — | — | — | — | — |
| Comp.Ex.2 | 100 | — | 10 | — | — | — | — | 5 |
| Comp.Ex.3 | 100 | — | 15 | — | — | — | 52 | 7 |
| Example.1 | 100 | — | 14 | 49 | — | — | — | — |
| Example.2 | 100 | — | 15 | 52 | — | — | — | 7 |
| Example.3 | 100 | — | 18 | 42 | — | — | 42 | 8 |
| Comp.Ex.4 | 100 | — | 18 | — | 42 | — | 42 | 8 |
| Comp.Ex.5 | 100 | — | 18 | — | — | 42 | 42 | 8 |
| Comp.Ex.6 | — | 100 | 6 | — | — | — | 45 | — |
| Example.4 | — | 100 | 6 | 45 | — | — | — | — |

Comp.Ex.: Comparative Example

These molded products were used for the measurement of properties. The results are shown in Table 2.

TABLE 2

| | CTI (V) | tensile strength (MPa) | flexural modulus (MPa) | deflection temperature under load (° C.) | flammability UL94 0.8 mm | flammability UL94 1.6 mm |
|---|---|---|---|---|---|---|
| Comp.Ex.1 | >600 | 60 | 2900 | 65 | HB | — |
| Comp.Ex.2 | 275 | 62 | 3000 | 70 | V-0 | — |
| Comp.Ex.3 | 250 | 135 | 9200 | >210 | V-0 | — |
| Example.1 | 400 | 115 | 10000 | >210 | V-2 | — |
| Example.2 | 375 | 110 | 10000 | >210 | V-0 | — |
| Example.3 | 350 | 110 | 12000 | >210 | V-0 | — |
| Comp.Ex.4 | 275 | 105 | 10000 | >210 | V-0 | — |
| Comp.Ex.5 | 275 | 115 | 9700 | >210 | V-0 | — |
| Comp.Ex.6 | 175 | 123 | 8000 | 147 | — | V-0 |
| Example.4 | 225 | 111 | 12300 | 140 | — | V-0 |

(C) 5 to 200 parts by weight of aluminum borate whiskers which are needle-like crystals of aluminum borate.

2. The resin composition of claim 1, wherein the thermoplastic resin (A) is an aromatic polyester.

3. The resin composition of claim 2, wherein the aromatic polyester is polybutylene terephthalate.

4. The resin composition of claim 3, which has a comparative tracking index (CTI) of at least 300 V.

5. The resin composition of claim 1, wherein the thermoplastic resin (A) is a polycarbonate.

6. The resin composition of claim 5, which has a CTI of at least 200 V.

7. The resin composition of claim 1, wherein the halogen-based flame retardant (B) is brominated polystyrene.

8. A thermoplastic resin composition comprising:
(A) 100 parts by weight of a thermoplastic resin;
(B) 5 to 80 parts by weight of a halogen-based flame retardant selected from the group consisting of a bromine-based flame retardant, a chlorine-based flame retardant and a mixture thereof;
(C) 5 to 100 parts by weight of aluminum borate whiskers which are needle-like crystals of aluminum borate; and
(D) 1 to 20 parts by weight of an antimony-based flame retardant aid.

9. The resin composition of claim 1 or 8, wherein the thermoplastic resin (A) is selected from the group consisting of polyethylene, polypropylene, ABS, polystyrene, aromatic polyester, aromatic polycarbonate, polyamide, polyoxymethylene, modified polyphenylene ether, aromatic polyamide, PPS and liquid crystal polymer.

10. A process for improving the CTI of a thermoplastic resin composition containing a halogen-based flame retardant, which comprises using aluminum borate whiskers comprising needle-like crystals of aluminum borate.

11. The process of claim 10, wherein the thermoplastic resin (A) is selected from the group consisting of polyethylene, polypropylene, ABS, polystyrene, aromatic polyester, aromatic polycarbonate, polyamide, polyoxymethylene, modified polyphenylene ether, aromatic polyamide, PPS and liquid crystal polymer.

12. A process for improving the CTI of a thermoplastic resin composition containing a halogen-based flame retardant, the process comprising the steps of compounding 5 to 200 parts by weight of aluminum borate whiskers comprising needle-like crystals of aluminum borate with a combination of 100 parts by weight of a thermoplastic resin and 5 to 80 parts by weight of a halogen-based flame retardant, selected from the group consisting of a bromine-based flame retardant a chlorine-based flame retardant, and a mixture thereof.

13. The process of claim 12 for improving CTI at least 50 V higher than the CTI of a composition consisting of a thermoplastic resin and the halogen-based flame retardant.

14. The process of claim 12, wherein the thermoplastic resin (A) is selected from the group consisting of polyethylene, polypropylene, ABS, polystyrene, aromatic polyester, aromatic polycarbonate, polyamide, polyoxymethylene, modified polyphenylene ether, aromatic polyamide, PPS and liquid crystal polymer.

* * * * *